United States Patent
Choi

(10) Patent No.: US 7,697,628 B2
(45) Date of Patent: Apr. 13, 2010

(54) DATA SIGNAL TRANSMISSION DEVICES AND METHODS FOR TERNARY-LINE DIFFERENTIAL SIGNALING

(75) Inventor: Chul-Ho Choi, Seoul (KR)

(73) Assignee: Samsung Electronics Co., Ltd. (KR)

( * ) Notice: Subject to any disclaimer, the term of this patent is extended or adjusted under 35 U.S.C. 154(b) by 868 days.

(21) Appl. No.: 11/502,258

(22) Filed: Aug. 10, 2006

(65) Prior Publication Data
US 2007/0160155 A1 Jul. 12, 2007

(30) Foreign Application Priority Data
Jan. 9, 2006 (KR) ............... 10-2006-0002259

(51) Int. Cl.
*H04L 25/34* (2006.01)
*H04L 25/49* (2006.01)
(52) U.S. Cl. ............... 375/288; 375/260; 375/296; 375/340; 341/55
(58) Field of Classification Search ........... 375/224, 375/257, 259–260, 286, 288, 292–293, 295, 375/299, 316; 327/100, 141, 291, 295, 297; 341/50, 55–56; 348/30, 55, 84, 87, 98
See application file for complete search history.

(56) References Cited

U.S. PATENT DOCUMENTS

| 6,317,465 | B1* | 11/2001 | Akamatsu et al. ........... 375/257 |
| 6,556,628 | B1* | 4/2003 | Poulton et al. ............... 375/257 |
| 2002/0180719 | A1* | 12/2002 | Nagai et al. .................. 345/206 |
| 2004/0236894 | A1* | 11/2004 | Grundy et al. ................. 711/1 |
| 2004/0239374 | A1 | 12/2004 | Hori |
| 2007/0164883 | A1* | 7/2007 | Furtner ........................ 341/126 |

FOREIGN PATENT DOCUMENTS

| JP | 11234348 | 8/1999 |
| JP | 2004356714 | 12/2004 |
| KR | 10-0472896 | 3/2005 |

* cited by examiner

*Primary Examiner*—Shuwang Liu
*Assistant Examiner*—James M Perez
(74) *Attorney, Agent, or Firm*—Myers Bigel Sibley & Sajovec

(57) ABSTRACT

An apparatus for transmitting data signals includes a logic unit configured to generate an encoded clock signal in response to a clock signal and a first data signal, and a demultiplexer configured to receive the encoded signal, the first data signal, and a second data signal, and to output odd-numbered data signals of the received signals at a first edge of the clock signal and even-numbered data signals of the received signals at a second edge of the clock signal. A data state elimination block is configured to receive the signals and to invert one of the received signals if logic levels of the signals are the same. An apparatus for receiving data signals according to some embodiments of the invention includes a plurality of termination resistors connected between a corresponding pad and a power source, a plurality of differential amplifiers configured to amplify a voltage difference between corresponding pads, and a logic unit configured to restore a clock signal from signals received from two of the differential amplifiers.

9 Claims, 7 Drawing Sheets

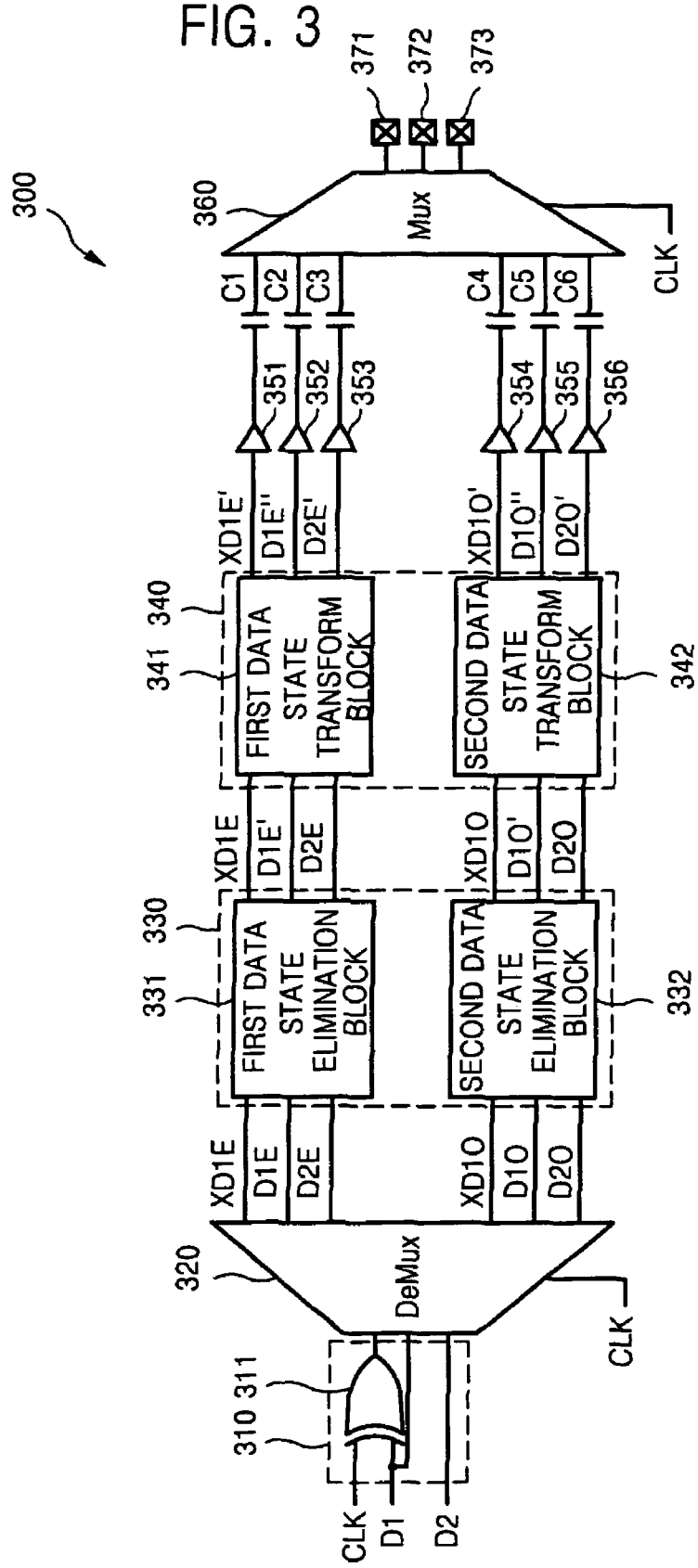

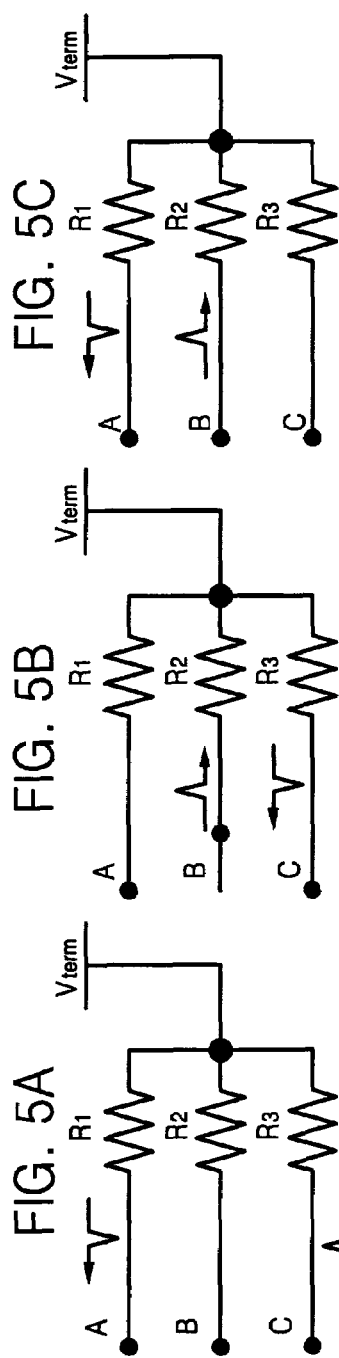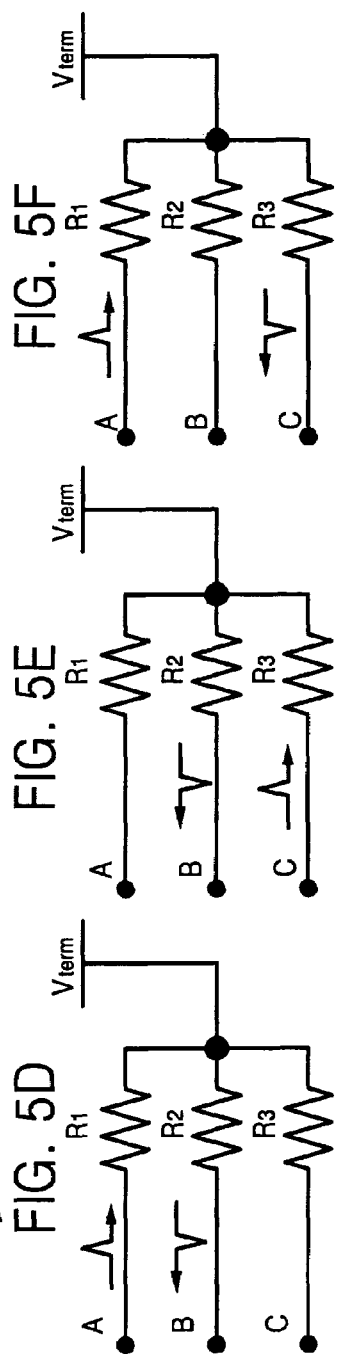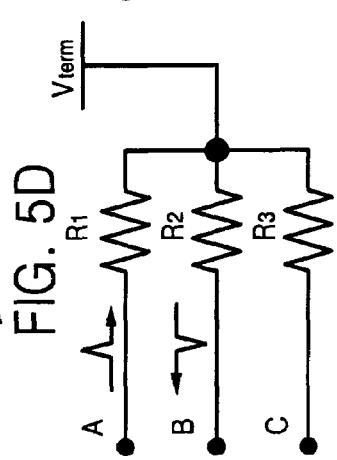

A
B
C

+200mV
+100mV
0mV
−100mV
−200mV

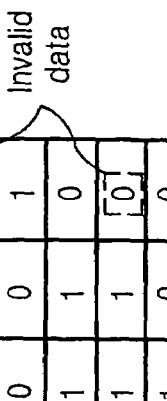
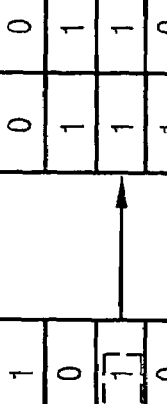
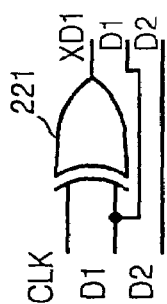
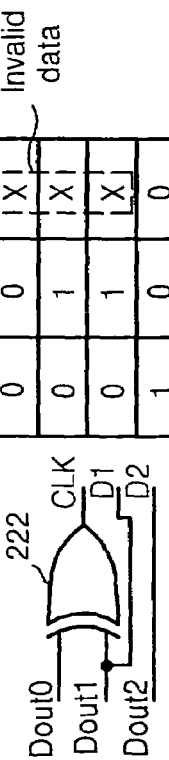
FIG. 7A  FIG. 7B  FIG. 7C  FIG. 7D  FIG. 7E

DATA SIGNAL TRANSMISSION DEVICES AND METHODS FOR TERNARY-LINE DIFFERENTIAL SIGNALING

CROSS-REFERENCE TO RELATED PATENT APPLICATION

This application claims priority under 35 U.S.C. §119 to Korean Patent Application No. 10-2006-0002259, filed on Jan. 9, 2006 in the Korean Intellectual Property Office, the disclosure of which is incorporated herein in its entirety by reference.

FIELD OF THE INVENTION

The present invention relates to data signal transmission devices and methods, and, more particularly, to data signal transmitting and receiving systems in which data signals are transmitted via ternary lines.

BACKGROUND OF THE INVENTION

For large-scale display panels and/or high-definition television (HDTV) monitors, it may be desirable to increase the data bit width and/or the number of channels used for data transmission in order to potentially increase the number of colors and/or the image quality of the display. Accordingly, it may be desirable to transmit data signals to the display at high speed and/or with low power consumption, and/or to reduce electromagnetic interference (EMI) generated in or near the display.

A data signal is typically transmitted via a transmission line as a digital signal. However, if the range of voltage swing of the data signal is reduced from a high voltage swing to low voltage swing in order to facilitate high-speed data transmission, the signal may be susceptible to noise, which may interfere with the signal. Differential signal transmission, in which data is transmitted via two lines, was introduced partly to address this problem.

FIG. 1A is a schematic circuit diagram of a transmitting and receiving apparatus 10 that transmits differential signals via two lines. Referring to FIG. 1A, the apparatus 10 includes a transmitting unit 20, a transportation unit 30, and a receiving unit 40. The transmitting unit 20 transforms a data signal D0, which is to be transmitted, into differential signals via a differential signal generator 21, and transmits the differential signals to output pads 22 and 23.

Then, the differential signals are supplied to pads 41 and 42 of the receiving unit 40 via lines 31 and 32, respectively. The supplied differential signals are matched by a termination resistor R between the lines 31 and 32, and voltages developed across the termination resistor R by the differential signals are amplified by an amplifier 43.

The polarity of the voltage developed across the termination resistor R, which is determined by the direction of current flowing through the termination resistor R, may represent one of two states (i.e. a logic low state or a logic high state). Therefore, two-state data (i.e., $\log_2$ 2-bit, or 1-bit data) can be transmitted via two lines 31 and 32. In this case, the transmission efficiency is 0.5 bits per line. However, the transmission efficiency of a differential signaling system may be increased by using three lines instead of two lines. Such a system may be referred to as a ternary line differential signaling system.

FIG. 1B is a schematic circuit diagram of a data transmitting and receiving system 100 that transmits data signals via ternary lines 121, 122, 123. Referring to FIG. 1B, the system 100 includes a transmitting unit 110, a transportation unit 120, and a receiving unit 130. The transmitting unit 110 includes an encoder block 111 that is configured to transmit a clock signal CLK and data signals D1, and D2 via ternary lines 121, 122, and 123. The encoder block 111 encodes the clock signal CLK so that the clock signal CLK can be transmitted together with the data signals D1 and D2 via the same line. The encoder block 111 drives current flowing through the transmitting unit 110 to generate a voltage difference having a magnitude and polarity that depends on the direction of current flowing through termination resistors R1, R2, and R3, respectively, of the receiving unit 130.

The receiving unit 130 receives signals transmitted via the lines 121, 122, and 123 of the transportation unit 120. The magnitudes and polarities of the voltages developed across the termination resistors R1, R2, and R3 are determined by the directions of the currents respectively flowing through the termination resistors R1, R2, and R3, based on the received signals.

If voltages between two resistors selected from the termination resistors R1, R2, and R3 are used for differential signal amplification, data signals having six different states may be generated. A decoder 134 of the receiving unit 130 receives the differentially amplified signals and restores the clock signal CLK and the data signals D1 and D2. Therefore, it is possible to transmit six-state data, i.e., 2.56 ($=\log_2$ 6)-bit data, via ternary lines 121, 122, and 123. In this case, the transmission efficiency is approximately 0.86 bits per line.

Accordingly, as described above, when differential signals are transmitted via ternary lines, it may be possible to increase the transmission efficiency of a differential signaling system. In addition, it may be possible to reduce manufacturing costs, since the number of lines per bit required is reduced, and/or to reduce noise such as EMI. However, if the transmission unit 110 transmits the clock signal CLK together with the data signals D1 and D2 via the same line, data may not be precisely recovered if the skew between the clock signal CLK and one or more of the data signals D1 or D2, which are restored by the receiving unit 130, is large.

FIG. 2A is a waveform diagram of voltages V(P), V(S), and V(T) of signals supplied to the receiving unit 130 of FIG. 1B. That is V(P) is a waveform of a voltage at node P of FIG. 2A, V(S) is a waveform of a voltage at node S of FIG. 2A, and V(T) is a waveform of a voltage at node T of FIG. 2A. FIG. 2B illustrates some possible values of the difference between two voltages selected from voltages V(P), V(S), and V(T) of the termination resistors R1, R2, and R3 of the receiving unit 130.

Referring to FIGS. 2A and 2B, an instant of time (t1 or t2) when the magnitude of two voltages V(P) and V(S), or V(P) and V(T), which are selected from the voltages V(P), V(S), and V(T) of the supplied signals, is changed, thus causing differential amplifiers 131, 132, and 133 of the receiving unit 130 to be driven at different times. Thus, when outputs of the differential amplifiers 131, 132, and 133 are restored by the decoder 134, there may be a skew between the clock signal CLK and the data signal D1 or D2. The skew between the clock signal CLK and the data signal D1 or D2 may interfere with the transmission of data.

The difference between two selected from voltages V(P), V(S), and V(T) of the supplied signals may have six possible state values, e.g., ±100 mV, ±200 mV, and ±300 mV. Thus, the six state values have 3 different magnitudes.

Accordingly, it may be desirable to reduce skew between the clock and data signals of a high speed ternary differential signaling system.

SUMMARY

An apparatus for transmitting data signals according to some embodiments of the invention includes a logic unit configured to generate an encoded signal in response to a clock signal and a first data signal, and a demultiplexer configured to receive the encoded signal, the first data signal, and a second data signal from the logic unit, and to output odd-numbered data signals of the received signals at a first edge of the clock signal and even-numbered data signals of the received signals at a second edge of the clock signal. A data state elimination block is configured to receive the encoded signal and the first and second data signals, and to invert a logic level of one of the received signals if logic levels of the encoded signal, the first data signal and the second data signal are the same. A plurality of buffers are configured to buffer corresponding signals received from the data state elimination block.

The apparatus further includes a multiplexer including a plurality of input terminals. A plurality of capacitors are connected between an output terminal of a corresponding buffer of the plurality of buffers and a corresponding input terminal of the plurality of input terminals of the multiplexer. The multiplexer is configured to output signals received from corresponding capacitors of the plurality of capacitors in response to the clock signal. The logic unit may include an exclusive-OR gate.

The apparatus may further include a data state transform block configured to receive the data signals from the data state elimination block and to change the logic level of at least one of the encoded signal, the first data signal and/or the second data signal. The data signal transform block may be configured to change the logic level of at least one signal of the encoded signal, the first data signal and/or the second data signal received from the data state elimination block, such that the logic level of the changed signal does not consecutively have the same value for more than 1.5 clock cycles.

An apparatus for receiving data signals according to some embodiments of the invention includes a plurality of termination resistors, a respective one of which is connected between a corresponding pad of a plurality of pads and a power source, a plurality of differential amplifiers, a respective one of which is configured to amplify a voltage difference between two corresponding pads of the plurality of pads and to generate an output signal in response to the amplification result, and a logic unit configured to restore a clock signal by performing a logic operation on signals received from two differential amplifiers selected from the plurality of differential amplifiers. The logic unit may include an exclusive-OR gate.

An apparatus for receiving data signals according to further embodiments of the invention includes a plurality of termination resistors, a respective one of which is connected between a corresponding pad of a plurality of pads and a power source, a plurality of differential amplifiers, a respective one of which is configured to amplify a voltage difference between two of the plurality of pads and to generate an output signal corresponding to the amplification result, and a decoder configured to receive the output signals from the differential amplifiers, to perform a logic operation on the output signals from two of the plurality of differential amplifiers, and to output a signal in response to the logic operation.

A system for transmitting and receiving data signals according to some embodiments of the invention includes a transmitting unit configured to transmit a clock signal, a first data signal, and a second data signal, and a receiving unit configured to recover signals received from the transmitting unit via a plurality of lines. The transmitting unit may include a first logic unit configured to perform a logic operation on the clock signal and the first data signal and to responsively generate an encoded signal, and a demultiplexer configured to receive the encoded signal, the first data signal, and the second data signal, and to output odd-numbered data signals of the received signals at a first edge of the clock signal and even-numbered data signals of the received signals at a second edge of the clock signal.

The transmitting unit further includes a data state elimination block configured to invert the logic level of one of the received signals if the logic levels of the received signals are the same, and a data state transform block configured to receive data signals from the data state elimination block and to change the logic level of at least one of the received signals. A plurality of buffers are configured to buffer a corresponding signal received from the data state transform block. The transmitting unit further includes a multiplexer including a plurality of input terminals, and a plurality of capacitors, a respective one of which is connected between an output terminal of a corresponding one of the plurality of buffers and a corresponding input terminal of the plurality of input terminals of the multiplexer. The multiplexer is configured to output signals received from corresponding capacitors of the plurality of capacitors, in response to the clock signal.

The receiving unit includes a plurality of termination resistors, a respective one of which is connected between a corresponding line of the plurality of lines and a power source, a plurality of differential amplifiers, a respective one of which is configured to amplify a voltage difference between two of the plurality of lines and to output a signal corresponding to the amplification result, and a second logic unit configured to restore the clock signal by performing a logic operation on the signals from two of the plurality of differential amplifiers.

The first and second logic units include exclusive-OR gates. Respective ones of the buffers may include N inverters connected in series, where N may be greater than or equal to 1.

Some embodiments of the invention provide a display device including a controller and a source driver. The controller includes a first logic unit configured to perform a logic operation on the clock signal and the first data signal and to responsively generate an encoded signal, and a demultiplexer configured to receive the encoded signal, the first data signal, and the second data signal, and to output odd-numbered data signals of the received signals at a first edge of the clock signal and even-numbered data signals of the received signals at a second edge of the clock signal.

The transmitting unit further includes a data state elimination block configured to invert the logic level of one of the received signals if the logic levels of the received signals are the same, and a data state transform block configured to receive data signals from the data state elimination block and to change the logic level of at least one of the received signals. A plurality of buffers are configured to buffer a corresponding signal received from the data state transform block. The transmitting unit further includes a multiplexer including a plurality of input terminals, and a plurality of capacitors, a respective one of which is connected between an output terminal of a corresponding one of the plurality of buffers and a corresponding input terminal of the plurality of input terminals of the multiplexer. The multiplexer is configured to output signals received from corresponding capacitors of the plurality of capacitors, in response to the clock signal.

The source driver includes a plurality of termination resistors, a respective one of which is connected between a corresponding pad of a plurality of pads of the source driver and a power source, a plurality of differential amplifiers, a respective one of which is configured to amplify a voltage difference between two of the plurality of lines and to output a signal corresponding to the amplification result, a second logic unit configured to restore the clock signal by performing a logic operation on the signals from two of the plurality of differential amplifiers, and a plurality of lines connected between the plurality of pads of the controller and the plurality of pads of the source driver.

Some embodiments of the invention provide methods of transmitting and receiving data, the methods including generating an encoded signal in response to a clock signal and a first data signal, and outputting odd numbered signals of the encoded signal, the first data signal, and a second data signal at a first edge of the clock signal, and even-numbered data signals of the encoded signal, the first data signal, and the second data signal at a second edge of the clock signal. The methods further include inverting the logic level of one of the encoded signal, the first data signal, or the second data signal if the logic levels of the encoded signal, the first data signal, and the second data signal are the same, and buffering the encoded signal, the first data signal and the second data signal. The buffered signals are output via corresponding capacitors in response to the clock signal. A voltage difference between two of the signals received via a plurality of lines connected to the capacitors is detected, and the clock signal is restored by performing a logic operation on two of the received signals.

BRIEF DESCRIPTION OF THE DRAWINGS

The accompanying drawings, which are included to provide a further understanding of the invention and are incorporated in and constitute a part of this application, illustrate certain embodiment(s) of the invention. In the drawings:

FIG. 3 is a block diagram of a data signal transmitting apparatus according to some embodiments of the present invention;

FIGS. 5A through 5F are circuit diagrams respectively illustrating six states in which data signals can be transmitted via ternary lines according to some embodiments of the invention;

FIG. 5G is a table illustrating level values of signals output from differential amplifiers shown in FIG. 4 according to some embodiments of the invention;

FIG. 7A is a table illustrating possible level values of data signals to be transmitted according to some embodiments of the invention;

FIG. 7B is a table illustrating possible level values of signals obtained by performing a logic operation on the data signals shown in FIG. 7A by a logic operation block of a transmitting apparatus according to some embodiments of the invention;

FIG. 7C is a table illustrating possible level values of data signals that are transformed so that they can be transmitted;

FIG. 7D is a table illustrating possible level values of signals output from differential amplifiers of a receiving apparatus according to some embodiments of the invention; and FIG. 7E is a table illustrating possible level values of signals output from a logic operation block of a receiving apparatus.

DETAILED DESCRIPTION OF EMBODIMENTS OF THE INVENTION

Figure 1A:
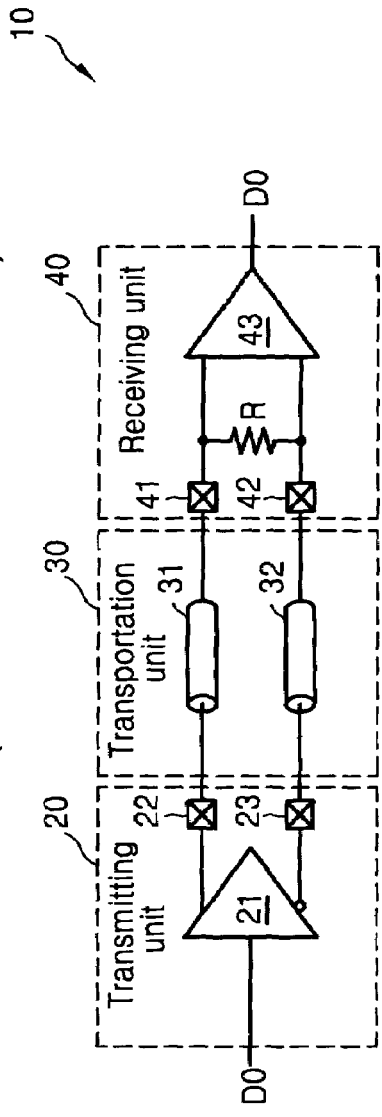
FIG. 1A is a schematic circuit diagram of a conventional transmitting and receiving apparatus that transmits differential signals via two lines.
Figure 1B:
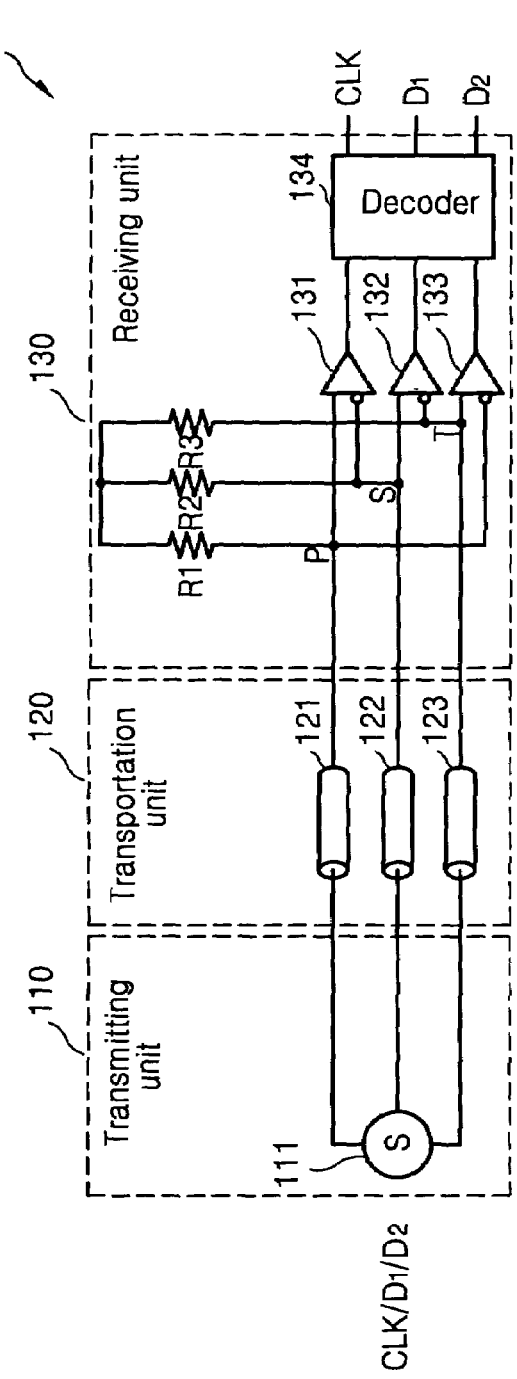
FIG. 1B is a schematic circuit diagram of a conventional transmitting and receiving system that transmits data signals via ternary lines.

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

FIG. 3 is a block diagram of a transmitting apparatus 300 according to some embodiments of the present invention. Referring to FIG. 3, the transmitting apparatus 300 includes a logic operation block 310, a demultiplexer (DeMux) 320, a data state elimination block 330, a data state transform block 340, a plurality of buffers 351 through 356, a plurality of capacitors C1 through C6, a multiplexer (Mux) 360, and a plurality of pads 371 through 373.

The logic operation block 310 includes a logic gate 311 that receives a clock signal CLK and a first data signal D1, performs a logic operation thereon, and outputs an encoded signal corresponding to the result of the operation. The logic operation block 310 passes the first data signal D1 and a second data signal D2 to the demultiplexer 320.

The logic gate 311 may be implemented, for example, using an exclusive-OR gate and/or an exclusive-NOR gate. The demultiplexer 320 receives the encoded signal from the logic gate 311 and the first and second data signals D1 and D2, outputs odd-numbered data signals XD1O, D1O, and D2O of the received signals in response to a first edge of the clock signal CLK, and outputs even-numbered data signals XD1E, D1E, and D2E of the received signals in response to a second edge of the clock signal CLK.

The data state elimination block 330 includes a first data state elimination block 331 and a second data state elimination block 332. The data state elimination block 330 receives the even-numbered data signals XD1E, D1E, and D2E and/or the odd-numbered data signals XD1O, D1O, and D2O. If the logic levels of the received signals are all the same, the data state elimination block inverts the logic level of one of the received signals so that the logic levels of the received signals are (0,0,1) or (1,1,0), for example.

The first data state elimination block 331 receives the even-numbered data signals XD1E, D1E, and D2E, and, if the logic levels of the received even-numbered data signals XD1E, D1E, and D2E are the same, inverts the logic level of one of them. Thus, if the logic levels of the received even-numbered data signals are (0,0,0) or (1,1,1), the first data state elimination block 331 inverts the logic level of one of the data signals so that the logic levels are (0,0,1) or (1,1,0), for example.

The second data state elimination block 332 receives the odd-numbered data signals XD1O, D1O, and D2O, and, if the logic levels of the received odd-numbered data signals XD1O, D1O, and D2O are the same, inverts the logic level of one of them. Thus, if the logic levels of the received odd-numbered data signals XD1O, D1O, and D2O are (0,0,0) or (1,1,1), the second data state elimination block 332 inverts the logic level of one of the data signals so that the logic levels are (0,0,1) or (1,1,0), for example.

The data state transform block 340 includes a first data state transform block 341 and a second data state transform block 342. For example, the first data state transform block 341 transforms even numbered values XD1E, D1E', and D2E of the signals received from the first data state elimination block 331 into signals XD1E', D1E'', and D2E', based on the levels of the first signals XD1E, D1E', and D2E, and outputs the signals XD1E', D1E'', and D2E'. That is, data to be transmitted are transformed to drive two lines in a transmitting and receiving system that uses ternary lines.

When a data signal to be transmitted, e.g., the data signal XD1E, has the same value continuously, the first data state transform block 341 transforms the data signal for pulse driving.

For example, if the logic level of at least one of the first signals XD1E, D1E', and D2E output from the first data state elimination block 331 continuously has a value of "1" for a 1.5 clock cycle, the level value of the data signal XD1E is changed to "0" before the 1.5 clock cycle ends and then is again changed to "1" at an edge where the 1.5 clock cycle ends for pulse driving.

Like the first data state transform block 341, the second data state transform block 342 transforms odd numbered values of the data signals XD1O, D1O, D2O.

The buffers 351 through 356 include first buffers 351 through 353 and second buffers 354 through 356. Each of the first buffers 351 through 353 buffers a corresponding one of the signals XD1E', D1E'', and D2E' output by the first data state transform block 341. Each of the second buffers 354 through 356 buffers a corresponding one of the signals XD1O', D1O'', and D2O' output by the second data state transform block 342.

The multiplexer 360 includes a plurality of input terminals. The capacitors C1 through C6 include first capacitors C1 through C3 and second capacitors C4 through C6. Each of the first capacitors C1 through C3 is connected between an output terminal of a corresponding one of the first buffers 351 through 353 and a corresponding one of the input terminals of the multiplexer 360. Each of the second capacitors C4 through C6 is connected between an output terminal of a corresponding one of the second buffers 354 through 356 and a corresponding one of the input terminals of the multiplexer 360.

The multiplexer 360 outputs signals from corresponding ones of the first capacitors C1 through C3 or the second capacitors C4 through C6 in response to the clock signal CLK.

Figure 4:
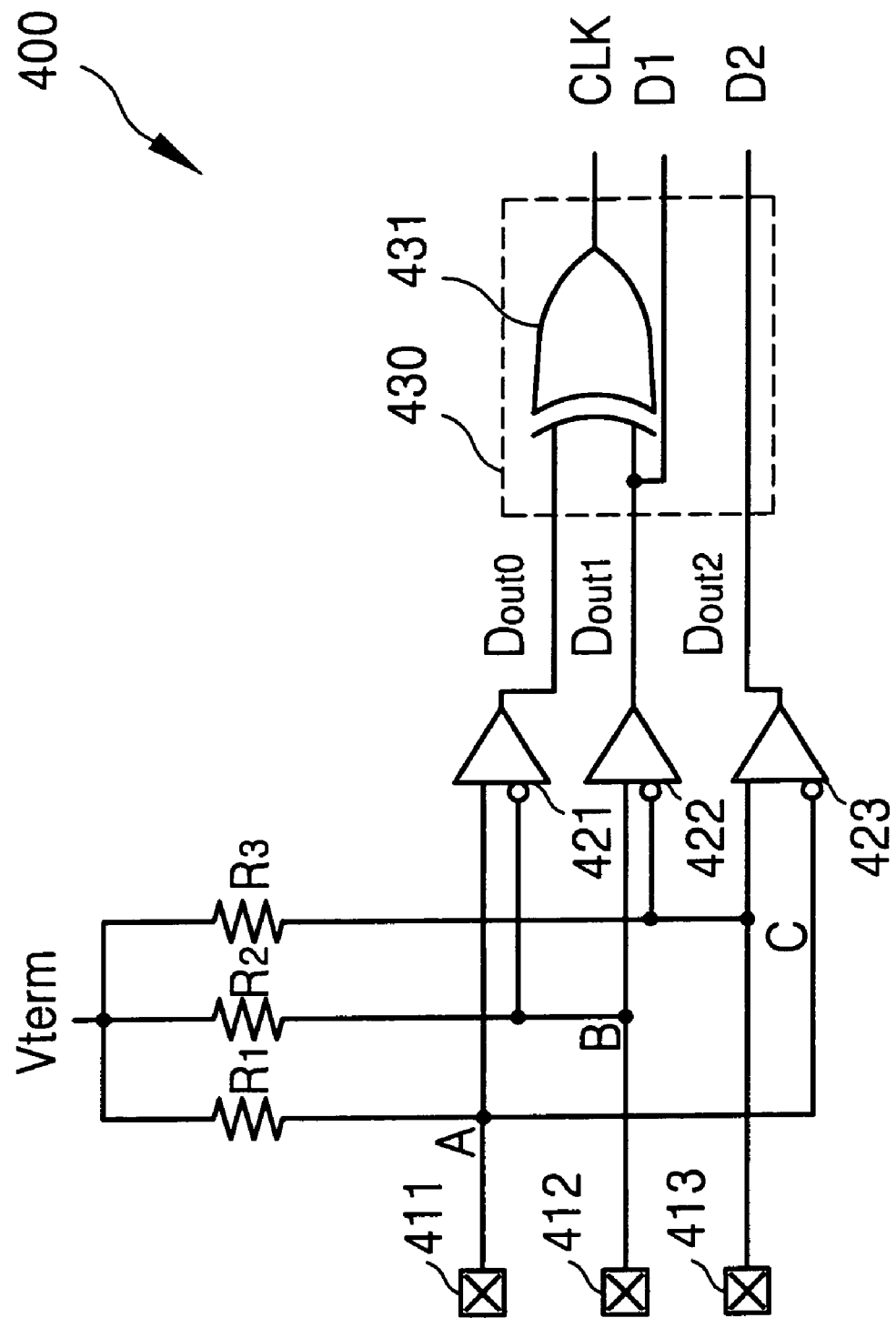
FIG. 4 is a circuit diagram of a data signal receiving apparatus according to some embodiments of the present invention.

FIG. 4 is a circuit diagram of a receiving apparatus 400 according to some embodiments of the present invention. Referring to FIG. 4, the receiving apparatus 400 includes a plurality of pads 411 through 413, a plurality of termination resistors R1 through R3, a plurality of differential amplifiers 421 through 423, and a logic operation block 430.

Each of the termination resistors R1 through R3 is connected between a corresponding one of the pads 411 through 413 and a power source Vterm. Each of the differential amplifiers 421 through 423 amplifies a voltage difference between two corresponding pads of the pads 411 through 413 (a voltage difference between two corresponding resistors of the termination resistors R1 through R3), and outputs a signal corresponding to the amplification result.

The logic operation block 430 includes a logic gate 431 that restores (or recovers) a clock signal CLK by performing a logic operation on signals from the two differential amplifiers 421 and 422 which are selected from the differential amplifiers 421 through 423. The logic gate 431 may be implemented using an exclusive-OR gate and/or an exclusive-NOR gate. The data signals D1 and D2 are output by the differential amplifiers 422 and 423, respectively.

FIGS. 5A through 5F are circuit diagrams respectively illustrating six states in which data signals can be transmitted via ternary lines. If current flowing through the termination resistors R1 through R3 of the receiving apparatus 400 of FIG. 4 flows from node C point to node A (FIG. 5A), the voltages at nodes A through C have the relationship $V(C)>V(B)>V(A)$.

Similarly, if current flows from node B to node C (FIG. 5B), then $V(B)>V(A)>V(C)$. If current flows from node B to node A (FIG. 5C), then $V(B)>V(C)>V(A)$. If current flows from node A point to node B (FIG. 5D), then $V(A)>V(C)>V(B)$. If current flows from node C to node B (FIG. 5E), then $V(C)>V(A)>V(B)$. Finally, if current flows from node A to node C (FIG. 5F), then $V(A)>V(B)>V(C)$.

Thus, the direction of the current flowing through the termination resistors R1 through R3 is determined by data signals output from the transmitting apparatus 300, and the voltages $V(A)$, $V(B)$, and $V(C)$ of the termination resistors R1 through R3 are determined by the direction of the current.

FIG. 5G is a table illustrating level values of signals Dout0 through Dout2 output from the differential amplifiers 421 through 423 shown in FIG. 4.

Referring to FIG. 5G, for example, when the voltages V(A), V(B), and V(C) of the termination resistors R1 through R3 of the receiver 400 have state (a) (the state of FIG. 5A), i.e. when the relationship between the voltages is V(C)>V(B)>V(A), the data signals output by the differential amplifiers 421 through 423 have values of (0,0,1). That is, since V(B)>V(A), the first differential amplifier 421 outputs a logic '0'. Since V(C)>V(B), the second differential amplifier 422 outputs a logic '0'. However, since V(C)>V(A), the third differential amplifier 423 outputs a logic '1'.

Stated differently, the difference between two voltages, e.g., V(A) and V(B), of the voltages V(A), V(B), and V(C) of the termination resistors R1 through R3 is amplified, and a signal corresponding to the amplified voltage difference, e.g., the data signal Dout0 having a value of 0, is output. Therefore, in the case of the state (a) of FIG. 5A, the signals Dout0 through Dout2 have values of (0,0,1), for example. The states (b) through (e) of FIGS. 5B through 5E are also illustrated in the table of FIG. 5A. Accordingly, transmission of data signals is accomplished using six possible states, which results in 2.56-bit ($\log_2$ 6-bit) data transmission.

Each of the capacitors C1 through C6 of the transmitting apparatus 300 of FIG. 3 and a corresponding one of the termination resistors R1 through R3 of the receiving apparatus 400 forms a circuit having high-pass filter characteristics. A transfer function T(s) of a high-pass filter is given by:

$$T(s) = \frac{sR1C1}{1 + sR1C1} \quad (1)$$

In Equation (1), the transfer function T(s) is proportional to frequency (s=jw and w denotes frequency), and therefore, the data signal transmitting and receiving system that includes the transmitting apparatus 300 and the receiving apparatus 400 can transmit high-frequency data signals (i.e. signals having a frequency greater than the cutoff frequency of the circuit) without substantial attenuation. However, since the transfer function T(s) of a DC signal (frequency s=0) has a value of 0 according to Equation (1), the system may not transmit the DC components of a signal, and therefore may not consume a significant amount of static power.

Also, a voltage, e.g., the voltage V(A), of voltages V(A), V(B), and V(C) of the termination resistors R1 through R3 is computed by differentiating a corresponding voltage, e.g., a voltage V(d1), of voltages V(d1), V(d2), and V(d3) of the buffers 351 through 353 of the transmitting apparatus 300, as follows:

$$V(A) = R1C1 \frac{d(V(d1))}{dt} \quad (2)$$

Figure 6A:
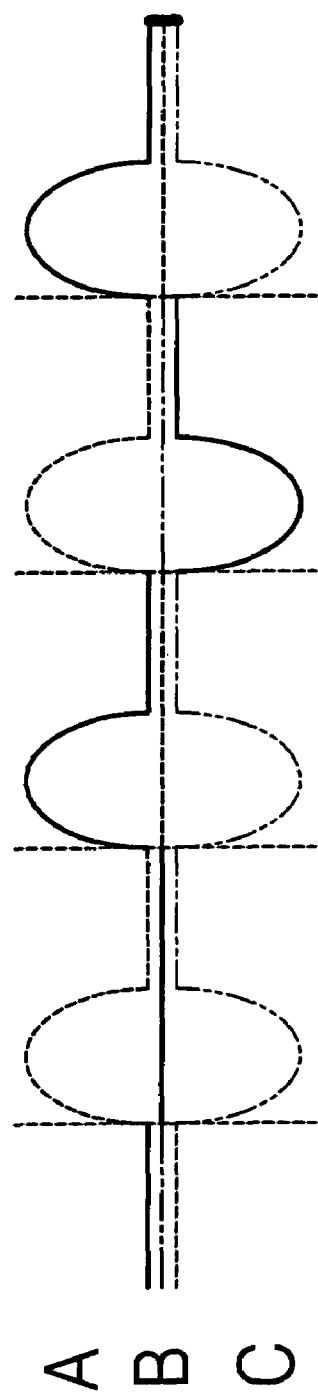
FIG. 6A is a waveform diagram of voltages of termination resistors of FIG. 4 according to some embodiments of the present invention.

FIG. 6A is a waveform diagram of voltages V(A), V(B), and V(C) of the termination resistors R1 through R3 of FIG. 4. Referring to FIG. 6A, the voltages V(A), V(B), and V(C) may be obtained by differentiating voltages, e.g., voltages V(d1), V(d2), and V(d3), of the transmitting apparatus 300.

Figure 6B:
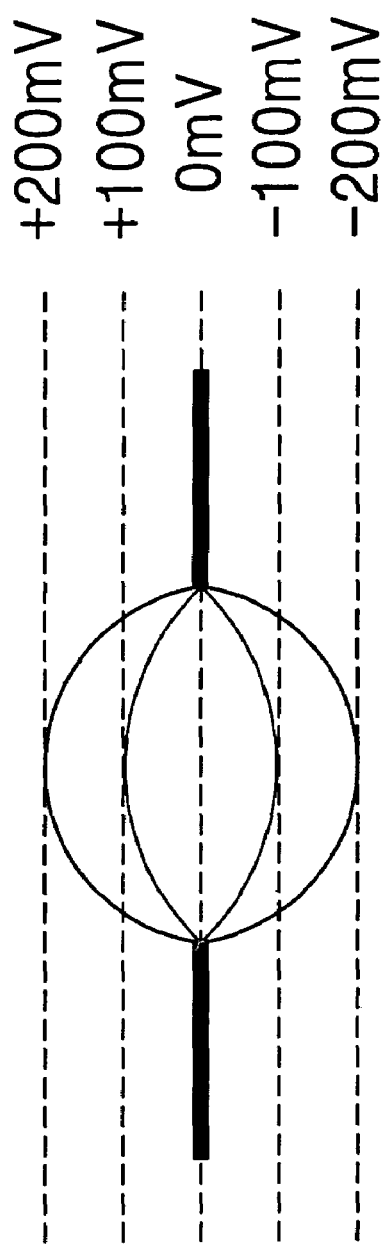
FIG. 6B is a diagram illustrating possible values of the difference between two voltages selected from voltages of termination resistors of FIG. 4 according to some embodiments of the invention.

FIG. 6B is a diagram illustrating possible values of the difference between two voltages selected from the voltages V(A), V(B), and V(C) of the termination resistors R1 through R3 of FIG. 4.

Figure 2A:
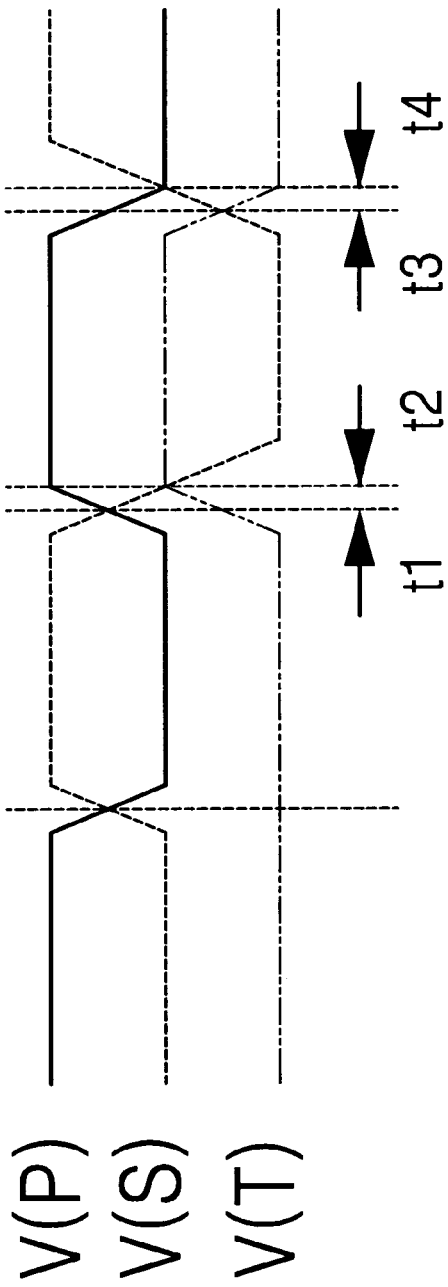
FIG. 2A is a waveform diagram of signals supplied to a receiving unit of FIG. 1B.
Figure 2B:
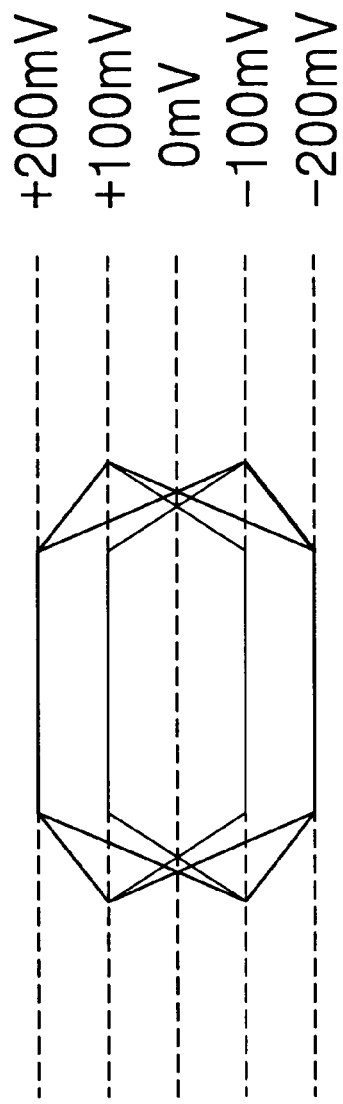
FIG. 2B illustrates possible values of the difference between two voltages selected from voltages of termination resistors included in the receiving unit of FIG. 1B.

Referring to FIG. 6B, the difference between the selected voltages has four possible values, i.e., ±100 mV and ±200 mV, and the four state values have two magnitudes. The number of the values of the difference between the selected voltages is less than that of the values of the difference between the selected voltages, which is described with reference to FIG. 2B. The less the number of values of the difference between the selected voltages, the less the potential skew between the clock signal and a data signal.

FIG. 7A is a table illustrating possible level values of data signals CLK, D1, and D2 that are 3-bit signals. Referring to FIG. 7A, the number of unique states that the 3-bit data signals CLK, D1, and D2 can have, is eight.

FIG. 7B is a table illustrating possible level values of signals XD1, D1, and D2 obtained by performing a logic operation on the data signals CLK, D1, and D2 of FIG. 7A by the logic operation block of a transmitting apparatus. As described above, it is possible to transmit data signals that have one of only the six states illustrated in FIG. 5, via ternary lines. Accordingly, referring to FIG. 7B, the level values (0,0,0) and (1,1,1) of the data signals XD1, D1, and D2, which are marked by a dotted box, are not presented in the table of FIG. 5A, and therefore, the data signals XD1, D1, and D2 may not be transmitted in this case.

FIG. 7C is a table illustrating possible level values of data signals XD1, D1, and D2' that are transformed so that they can be transmitted. Referring to FIG. 7C, in a state where the data signals XD1, D1, and D2 cannot be transmitted, i.e., when their values are (0,0,0) or (1,1,1), they are transformed into data signals XD1, D1, and D2' by inverting one of these signals, e.g., the data signal D2. In this case, the data signal D2' has an invalid value different from the original value.

FIG. 7D is a table illustrating possible level values of signals Dout0, Dout1, and Dout2 output from differential amplifiers of a receiving apparatus. Referring to FIG. 7D, when the signal Dout2 has one of values marked by a dotted box, the receiving apparatus is not capable of determining whether the signal Dout2 is a valid data signal.

FIG. 7E is a table illustrating possible level values of signals CLK, D1, and D2 output from the logic operation block of a receiving apparatus. When the logic operation block performs a logic operation on the signals Dout0, Dout1, and Dout2 illustrated in FIG. 7D and outputs the signals CLK, D1, and D2 having the values shown in FIG. 7E as the operation result. Accordingly, the values of the signal D2, which are marked by a dotted box, are invalid values.

Therefore, the data signal D1 of the signals CLK, D1, and D2 output from the logic operation block may have valid data values at both a rising edge and a falling edge of the clock signal CLK, but the data signal D2 may have a valid data value only at the rising edge of the clock signal CLK. Thus, a 3-bit data signal is transmitted for each clock cycle.

As described above, data signal transmitting and receiving systems/methods according to some embodiments of the present invention may transmit data signals via ternary lines to increase the transmission efficiency of the system. The systems/methods may transmit data signals by using capacitors included in a transmitting apparatus to improve high-frequency characteristics and/or to minimizes consumption of DC current. The systems/methods may encode a signal to be transmitted and decode a received signal to reduce skew between a clock signal and the data signal.

In the drawings and specification, there have been disclosed typical embodiments of the invention and, although specific terms are employed, they are used in a generic and descriptive sense only and not for purposes of limitation, the scope of the invention being set forth in the following claims.

What is claimed is:

1. An apparatus for transmitting data signals, comprising:
a logic unit configured to generate an encoded signal in response to a clock signal and a first data signal;
a demultiplexer configured to receive the encoded signal, the first data signal, and a second data signal from the logic unit, and to output odd-numbered data signals of the received signals at a first edge of the clock signal and even-numbered data signals of the received signals at a second edge of the clock signal;
a data state elimination block configured to receive the encoded signal and the first and second data signals, and to invert a logic level of one of the received signals if logic levels of the encoded signal, the first data signal and the second data signal are the same;
a plurality of buffers, a respective one of which is configured to buffer a corresponding signal received from the data state elimination block;
a multiplexer including a plurality of input terminals; and
a plurality of capacitors, a respective one of which is connected between an output terminal of a corresponding buffer of the plurality of buffers and a corresponding input terminal of the plurality of input terminals of the multiplexer,
wherein the multiplexer is configured to output signals received from corresponding capacitors of the plurality of capacitors in response to the clock signal.

2. The apparatus of claim 1, wherein the logic unit comprises an exclusive-OR gate.

3. The apparatus of claim 1, further comprising:
a data state transform block configured to receive the data signals from the data state elimination block and to change the logic level of at least one of the encoded signal, the first data signal and/or the second data signal.

4. The apparatus of claim 3, wherein the data signal transform block is configured to change the logic level of at least one signal of the encoded signal, the first data signal and/or the second data signal received from the data state elimination block, such that the logic level of the changed signal does not consecutively have the same value for more than 1.5 clock cycles.

5. A system for transmitting and receiving data signals, comprising:
a transmitting unit configured to transmit a clock signal, a first data signal, and a second data signal; and
a receiving unit configured to recover signals received from the transmitting unit via a plurality of lines,
wherein the transmitting unit comprises:
a first logic unit configured to perform a logic operation on the clock signal and the first data signal and to responsively generate an encoded signal;
a demultiplexer configured to receive the encoded signal, the first data signal, and the second data signal, and to output odd-numbered data signals of the received signals at a first edge of the clock signal and even-numbered data signals of the received signals at a second edge of the clock signal;
a data state elimination block configured to invert the logic level of one of the received signals if the logic levels of the received signals are the same;
a data state transform block configured to receive data signals from the data state elimination block and to change the logic level of at least one of the received signals;
a plurality of buffers, a respective one of which is configured to buffer a corresponding signal received from the data state transform block;
a multiplexer including a plurality of input terminals; and
a plurality of capacitors, a respective one of which is connected between an output terminal of a corresponding one of the plurality of buffers and a corresponding input terminal of the plurality of input terminals of the multiplexer,
wherein the multiplexer is configured to output signals received from corresponding capacitors of the plurality of capacitors, in response to the clock signal, and
wherein the receiving unit comprises:
a plurality of termination resistors, a respective one of which is connected between a corresponding line of the plurality of lines and a power source;
a plurality of differential amplifiers, a respective one of which is configured to amplify a voltage difference between two of the plurality of lines and to output a signal corresponding to the amplification result; and
a second logic unit configured to restore the clock signal by performing a logic operation on the signals from two of the plurality of differential amplifiers.

6. The system of claim 5, wherein the first and second logic units comprise exclusive-OR gates.

7. The system of claim 5, wherein a respective one of the buffers comprises N inverters connected in series, where N is greater than or equal to 1.

8. A display device comprising a system for transmitting and receiving data signals according to claim 5.

9. A method of transmitting and receiving data, comprising:
generating an encoded signal in response to a clock signal and a first data signal;
outputting odd numbered signals of the encoded signal, the first data signal, and a second data signal at a first edge of the clock signal, and even-numbered data signals of the encoded signal, the first data signal, and the second data signal at a second edge of the clock signal;
inverting the logic level of one of the encoded signal, the first data signal, or the second data signal if the logic levels of the encoded signal, the first data signal, and the second data signal are the same;
buffering the encoded signal, the first data signal and the second data signal outputting the buffered signals via corresponding capacitors in response to the clock signal;
detecting a voltage difference between corresponding two signals of the encoded signal, the first data signal and the second data signal received via a plurality of lines connected to the capacitors; and
restoring the clock signal by performing a logic operation on two of the received signals.

* * * * *